United States Patent [19]
Freitag

[11] 3,720,108
[45] March 13, 1973

[54] DIFFERENTIAL PRESSURE MEASURING MECHANISM

[76] Inventor: Edmund Freitag, Tillystrasse 1, Minden, Westphalia, Germany

[22] Filed: Feb. 24, 1971

[21] Appl. No.: 118,350

[30] Foreign Application Priority Data

Feb. 26, 1970 Germany..................P 20 09 043.1

[52] U.S. Cl. ..................73/398 R, 73/407 R, 336/30
[51] Int. Cl. .................................................G01l 9/10
[58] Field of Search ........73/398 R, 407, 393, 398 C; 336/30

[56] References Cited

UNITED STATES PATENTS 3,492,872   2/1970   Caspar et al..........................73/407

Primary Examiner—Donald O. Woodiel
Attorney—Ralf H. Siegemund

[57] ABSTRACT

Mechanism is symmetrical on each side of a middle plate provided with opening therethrough containing electrical inductive pickup responsive to position of a rod carrying rigid inner part of measuring membranes on each end. Membrane sockets over the opening provide a chamber enclosing pickup and filled with liquid. Compensating membranes allow for thermal expansion of liquid.

11 Claims, 4 Drawing Figures

DIFFERENTIAL PRESSURE MEASURING MECHANISM

BACKGROUND OF THE INVENTION

The present invention relates to improvements in differential pressure measuring mechanism for high pressure.

There has been a differential pressure gauge wherein an elastic membrane inside a housing is connected with an electromagnetic pickup or sensor to provide an electrical signal corresponding to displacement of the membrane. In such a gauge there is a second membrane to serve as a check or reverse element for protecting the fluid filled space about the pickup from corrosive media whose pressure is being measured. Only the elastic membrane is employed for the function of actual measurement.

In another differential pressure gauge having two elastic membranes, a pointer for scale readings is actuated by lever rods projecting outside a housing. The mechanical means for translating membrane displacement to the exterior necessitates additional space inside the housing in order that suitably large pointer movement be obtained, and this introduces frictional losses which adversely affect the sensitivity of the differential pressure instrument works.

An object of the invention is to produce a differential pressure measuring apparatus for high pressure of the sort described having a fluid filled chamber containing an electromagnetic pickup, all within a housing, which will possess high measuring accuracy and better zero stability and whose measurement signals will be independent of temperature and static pressure fluctuations over a wide range of use. Hence the maximum movement of the membrane should be very very small, of the order of 0.1 mm, and thereby only a very small volume displacement attend the measuring process.

DESCRIPTION OF THE INVENTION

The invention, briefly described, comprises, a symmetrically developed measuring works wherein two annular measuring membranes are parallel and provided with membrane supports in socket pieces, the latter providing side walling for a fluid chamber, with an intermediate or central plates. The measuring membranes are carried on respective inner plates connected fast to each other at their centers by a connecting rod passing through the middle of the central plate and socket pieces. Measuring springs on the two respective sides of the central plate act on the connecting rod. The symmetry extends to having a half of the sensor or pickup in one half of the chamber and the other half in the other and in position symmetrical to the connecting rod.

Figure 1:
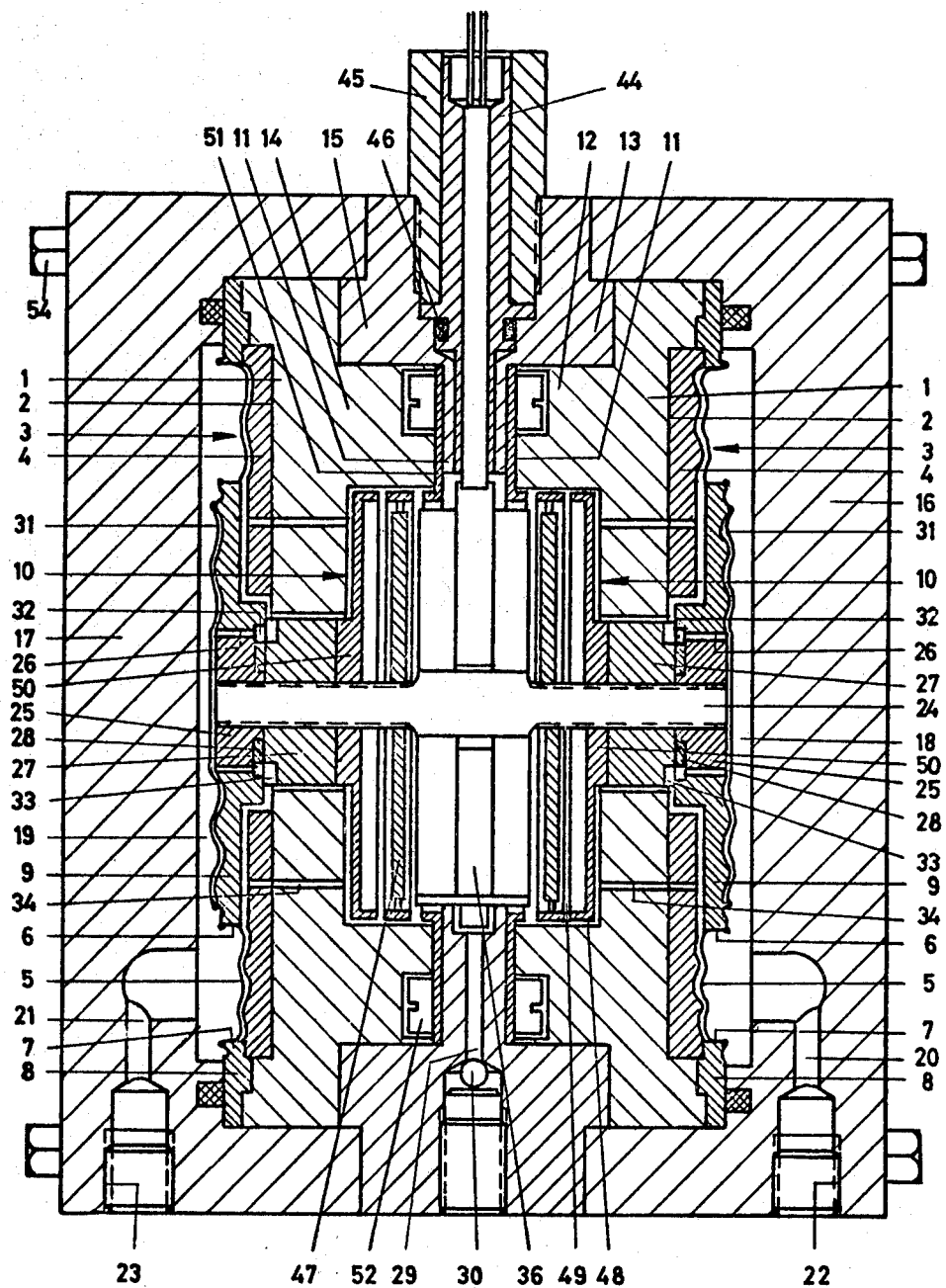
FIG. 1 is a substantially diametric cross section of the invention.

The pressure gauge, as shown in FIG. 1 includes two membrane sockets or holders 1, situated in mirror image fashion having their respective bottoms 2 each facing outwardly. The socket bottoms cover backing plates 4 which serve as beds for measuring or sensing membranes 3. the mounting of the backing plates in the membrane sockets can be accomplished, for example, by clamping action as by rings 8. The oppositely facing surfaces of the membrane and the backing plate, which are spaced on the order of about 0.1 mm, are shaped to match each other. Each measuring membrane 3 is made up of an elastic, circularly corrugated or grooved piece 5 having decidedly drawn-out inner and outer edge flanges 6 and 7. The top edges of these flanges are soldered or welded to the top flange of outer ring 8 and an inner plate 9. the outer ring of the membrane is disposed on the periphery of the membrane socket and held to it by welding. The backing plates are composed of a metal such as is used for membranes like copper or yieldable aluminum, for example. In order to obtain the most exact matching of the surfaces of the backing or bed plate and the membranes which face each other, the unit made up of membrane socket, the backing plate and the membrane, is subjected to pressure exceeding the maximum operating pressure for the gauge. At this super pressure, the ductility of the backing plate enables the mating surfaces of the membrane and backing plate to fully conform to each other.

The rear faces of the membrane sockets, facing each other, form a cylindrical chamber 10 which is divided into two equal halves by a central plate 11, whereby corresponding annular inserts 12, 13, 14, 15 engage in each other at the membrane sockets and the central plate. An electromagnetic sensing system is housed in the chambers, and is described in detail below.

Two cap members 16 and 17 over the membrane sockets are provided with pressure spaces 18 and 19 for the two media whose pressure is to be compared. Cap members 16 and 17 together with the inserts of plate 11 define an enclosure for the mechanism. The entrance for the media into the respective spaces 18 and 19 to act on the two measuring membranes is afforded through passageways 20 and 21 in the cap members 16 and 17. The passageways are threaded as at 22 and 23 to receive connector means for the media.

Both measuring membranes are rigidly connected to each other by a connecting rod 24 passing through central holes in the inner plates 9, the membrane sockets 1 and the central plate 11. The rigid connection is effected by means of fastening nuts 25, in depressions 26 in the plates 9 and screwed on to the ends of a rod 24 and held by lock nuts 27 bearing on washers 28 between the adjacent nuts.

A passageway 29 in the central plate 29 serves for filling the chamber with an incompressible liquid. After the chamber is filled, the passageway 29 is closed by a ball 30 seated at its outer opening. The liquid fills in the free chamber space and the space between the membranes and their backing plates. The liquid also reaches two compensating membranes 31 which are provided on outstanding rims of the inner plates 9. The liquid gets to the rear faces of the compensating membranes 31 through gaps between the connecting membrane sockets 1 and the lock nuts 27 on the connecting rod and via spaces between inner plates 9 and the pastening nuts 25 as well as through bores 32 in the inner plates and channels 33 in the lock nuts 27. The surfaces of the compensating membranes and those lying opposite on the inner plates are provided with conforming grooves. The compensating membranes serve the purpose of making the measured results substantially independent of temperature-difference action, which may be appreciable for the filling fluid at high temperatures. Narrow passages 34 are provided between the chamber 10 and the measuring membranes to dampen the measuring works.

Figure 2:
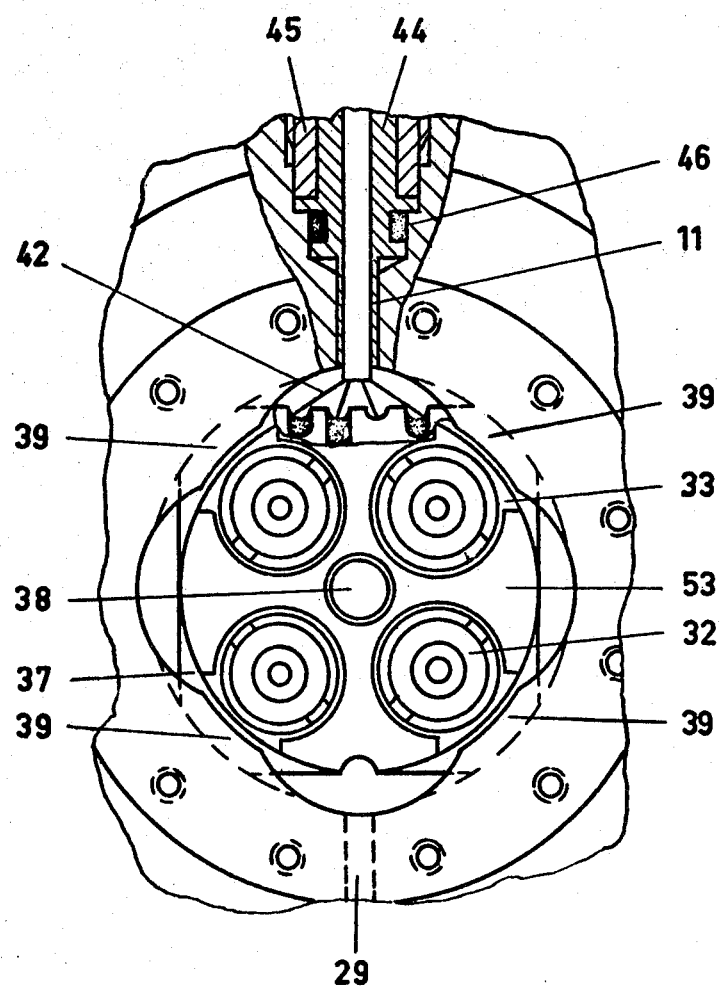
FIG. 2 is a side view of the middle parts of the central plate with a fixed part of the electromagnetic pickup system.
Figure 3A:
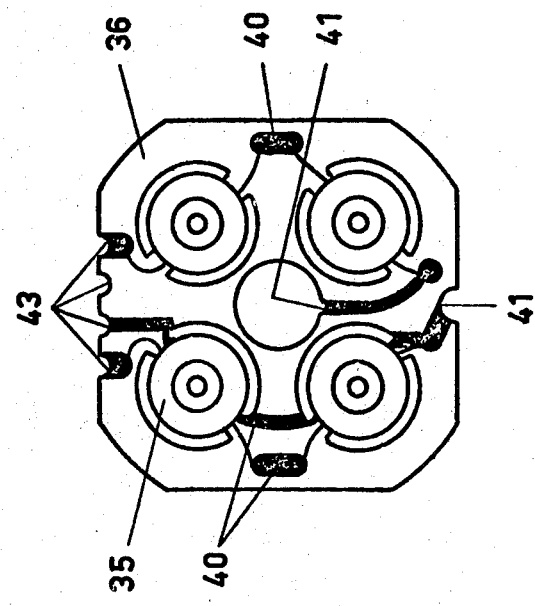
FIGS. 3a and 3b show details of construction of the pick-up.
Figure 3B:
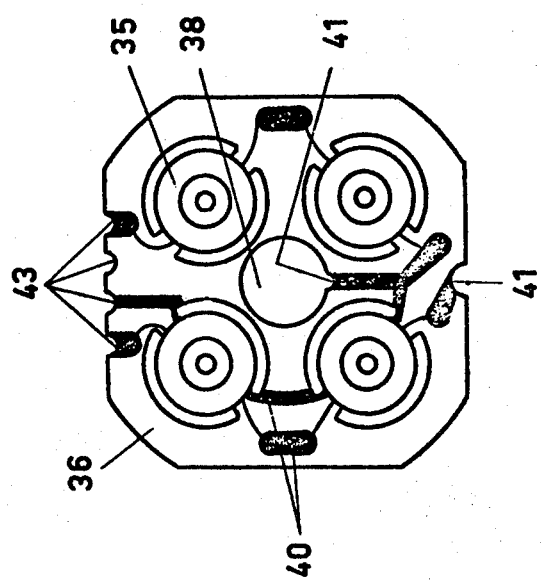

The electromagnetic pickup system provided in the chamber 10 is shown in FIGS. 3a and 3b and is made up of eight ferrite core coils 35 of which four are fastened on each side of a somewhat octagonal ceramic plate 36. The ceramic plate is located in an opening 37 in the central plate 11 (FIG. 2) and is provided with a central hole 38 through which the connecting rod 24 passes. The ceramic plate is held fast in grooves 39 in the walls of the opening 37, the ceramic plate being first inserted in the opening and then given about an eighth of a turn so that the corners of the ceramic plate fit in the grooves 39 in somewhat bayonet fashion. The ferrite core coils mounted symmetrically about the connecting rod on both sides of the ceramic plate form the stationary part of the electromagnetic pickup system. Each two coils on one side of the ceramic plate connected in series form a leg of an inductance measuring bridge. The eight coils being interconnected by means of conductive strips 40 on the ceramic plate to form the bridge, with those strips leading from one side of the ceramic plate to the other being in peripheral notches 41. Lead wires 42 to the bridge from the exterior are soldered to conductive strips in adjacent peripheral notches 43 in the plate 36. The lead wires pass pressure-tight through a lead-in element 44 held secure in a bore in the central plate pressure-tight by means of a screw socket 45 and packing ring 46.

Inside the chamber 10 of the differential pressure measuring works there is, on each side of the ceramic plate opposite the ferrite core coils, a ferrite disc 47 mounted fast on the connecting rod 24. The ferrite disc constitute the movable part of the electromagnetic pickup or sensing system. Membrane movement is transmitted to the discs which alters the inductance of the bridge which can be measured, by voltage output of the bridge for example, as an indication of pressure difference.

Two measuring reaction springs 48 in the chamber 10 operate counter to the force of deflection on the membranes. The springs are in the form of metal cylinders provided with staggered radial slits so that the spring action in confined substantially to the axial direction. Bosses 50 of the springs are screwed on the connecting rod 24 and flanges 51 of the springs are secured fast on the central plate 11 by screws 52.

All parts in the chamber 1 are so shaped and dimensioned that the amount of filling liquid is as insignificant as possible. Because of this, filler pieces 53 as shown in FIG. 2 having thickness corresponding to the height of the core coils are clamped on to each side of the ceramic plate 36. The slight remaining space between the ceramic plate and the central plate can be filled with plastic, but so that the adjoining space at the filling duct 29 remains open. An extremely small amount of filling liquid will therefore suffice, and the temperature alteration of the liquid volume is held to a small amount. With the help of the compensating membranes, the effect of the volume alterations due to temperature changes cancel out any movement of the measuring membranes and the temperature stability of the instrument is assured. For the same reasons, the volume of liquid between the measuring membranes and their backing plates is kept very small. A variation in displacement of measuring membranes of only 0.1 mm is sufficient for the scope of the measuring range.

Screw bolts 54 in the caps 16 and 17 hold all parts of the differential pressure measurer together.

The invention claimed is:

1. A differential pressure measuring mechanism for high pressure, comprising:
   means for defining an enclosure;
   a first and a second annular membrane each having annular corrugation, and inner and outer rims;
   first and second outer annular support means in the enclosure and respectively secured to the outer rims of the first and second annular membranes, in fluid tight connection therewith; socket means for mounting the first and second annular support means in the enclosure so that the first and second membrane are disposed in axially spaced relation, the socket means provided in-between the membranes, the socket means defining an internal chamber, there being a fluid in said chamber;
   first and second backing plates on the socket means, respectively facing the first and second membrane and each having contour where facing the respective membrane matching the corrugation contour of the respective membrane, the membrane respectively exposed to fluids under pressure opposite the respective backing means;
   first and second inner support means respectively secured to the inner rims of the first and second annular membranes in fluid-tight connection therewith;
   a connecting rod connected to the first and second inner support means, providing rigid connection there-between and passing through said chamber;
   reaction spring means connected to and acting on the interconnected inner support means for opposing deflection of the membranes; and
   pick up means in the chamber for providing electrical signals in response to displacement of the inner connected inner support means.

2. A mechanism as in claim 1 a central plate in the chamber and provided with an opening therethrough, the plate dividing the chamber into two like halves, the connecting rod passing through the middle of the central plate, the reaction springs mounted fast on the plate and acting on the rod, respective two halves of the pickup means disposed in the respective chamber halves and being disposed substantially symmetric to the rod.

3. A mechanism as claimed in claim 1, each measuring membrane having inner and outer upstanding flanges, each said first and second inner support means having an inner plate axially inner of the opening of the annulus of the respective membrane, the inner and outer flanges of each membrane respectively fluid-tight connected to the inner plate and the outer support means respectively.

4. A mechanism as claimed in claim 3, wherein said inner plate is provided with annular grooves opening outwardly and a compensating membrane having its periphery secured to the inner plate.

5. A mechanism as claimed in claim 4, and passageways being provided through the socket means, and backing plates and inner plates, for communication between the chamber and space between the compensating membrane and the inner plate.

6. A mechanism as claimed in claim 3, wherein the inner plates are provided with counter sunk central openings, the connecting rod passing through the openings, and screw nuts on the rod and in the respective sinks of the openings for connecting the inner plates and thereby the measuring membranes with each other.

7. A mechanism as claimed in claim 1, wherein said spring means have springs symetrically located in the respective halves of the chamber and cylindrical in shape and provided with radial slits to limit action to the axial direction, the springs being secured to the respective ends of the connecting rod as well as to the central plate.

8. A mechanism as claimed in claim 7, wherein coils having magnetic cores fixed relative thereto are mounted fast with respect to the central plate, and with a magnetic disc adjacent and fixed with respect to the connecting rod, constitute one of said halves of a pickup.

9. A mechanism as claimed in claim 8, wherein the coils and cores making up both halves of the pickup are mounted fast on a ceramic plate in the opening through the central plate.

10. A mechanism as claimed in claim 9, wherein said walls of the opening through the central plate is provided with internal grooving receiving corner portions of the ceramic plate.

11. A mechanism as claimed in claim 10, wherein four of said coils are on each side of the ceramic plate symetrically spaced about the axis of the connecting rod, and two adjacent coils form a leg of a bridge circuit, and leads for the bridge circuit.

* * * * *